F. A. ROSS.
ODOMETER RESETTING DEVICE.
APPLICATION FILED JUNE 30, 1916.
1,269,218.
Patented June 11, 1918.
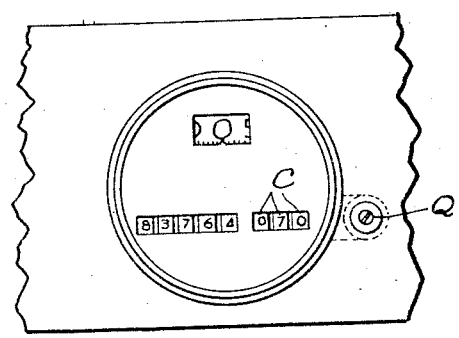
Fig. 1.
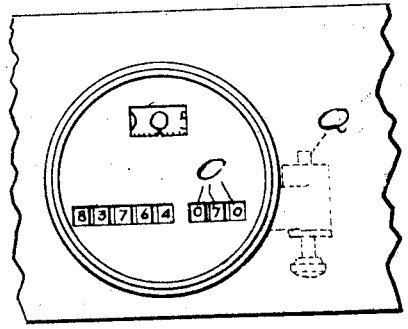
Fig. 2.
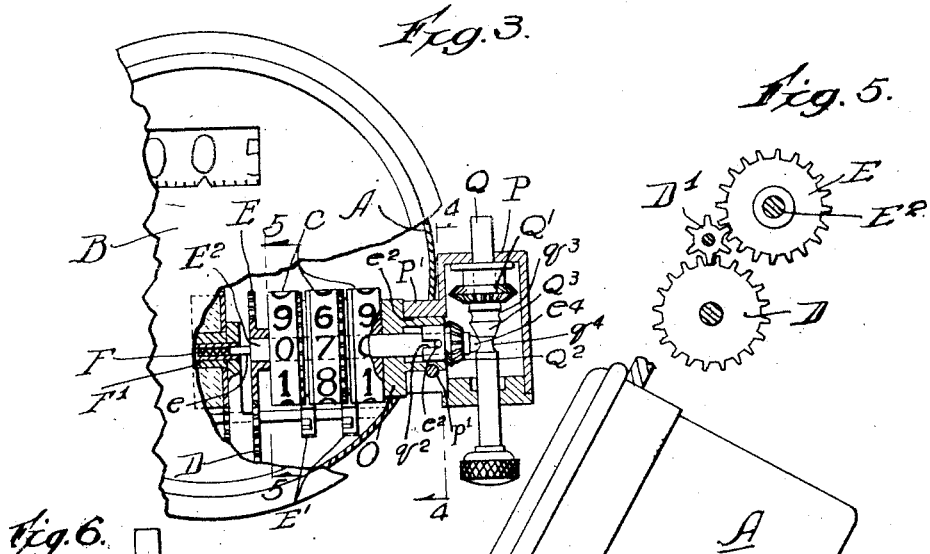
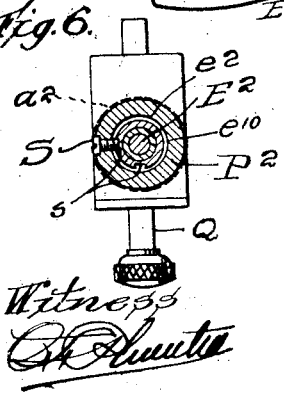
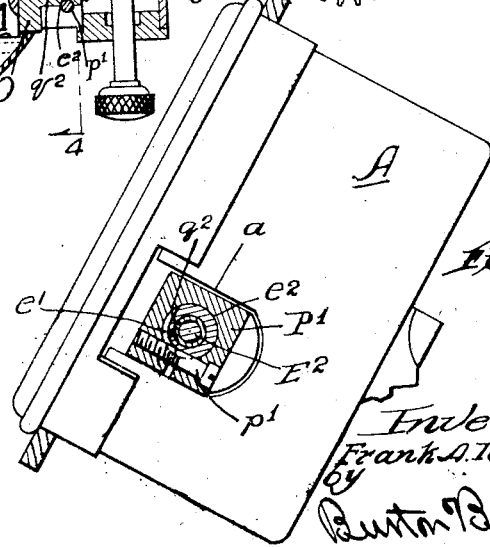
Inventor
Frank A. Ross
by
Burton & Burton
his Attys.
Witness

UNITED STATES PATENT OFFICE.

FRANK A. ROSS, OF CHICAGO, ILLINOIS, ASSIGNOR TO STEWART-WARNER SPEEDOMETER CORPORATION, OF CHICAGO, ILLINOIS, A CORPORATION OF VIRGINIA.

ODOMETER-RESETTING DEVICE.

1,269,218.

Specification of Letters Patent.   Patented June 11, 1918.

Application filed June 30, 1916.   Serial No. 106,775.

*To all whom it may concern:*

Be it known that I, FRANK A. ROSS, a citizen of the United States, residing at Chicago, in the county of Cook and State of Illinois, have invented new and useful Improvements in Odometer-Resetting Devices, of which the following is a specification, reference being had to the accompanying drawings, forming a part thereof.

The purpose of this invention is to provide an odometer with improved manually operating or resetting device. It consists in the elements and features of construction shown and described as indicated in the claims.

In the drawings:

Figures 1 and 2 are face views of an instrument embodying this invention mounted in a dash-board showing the resetting device in dotted line in the two positions for which it is adapted.

Fig. 3 is a partly sectional front elevation of an instrument comprising an odometer and embodying this invention, section being made through a portion of the odometer train and resetting devices axially with respect to the prime shaft and resetting shaft of said train.

Fig. 4 is a section at the line, 4—4, on Fig. 3.

Fig. 5 is a detail section at the line, 5—5, on Fig. 3.

Fig. 6 is a detail section at the same plane as Fig. 4 looking in the opposite direction and showing a modification.

The instrument represented in the drawings is designed to comprise a speedometer mechanism (not shown except as to the graduated scale and dial aperture therefor), and an odometer in the same case, the case being adapted to be mounted so as to expose the dial plate substantially flush at the surface of the dash-board of the vehicle whose speed of travel is to be indicated; and a primary purpose of the invention is to adapt the resetting device to be adjusted at preference, either to expose the operating handle or knob at the side of the dash-board toward the operator, or at the opposite side thereof; and in connection with this purpose to adapt said resetting device to be at all times out of engagement for any actuation of the indicating or counter-train when that train is in engagement with the gear by which it is driven for indicating travel.

The instrument comprises a cylindrical case, A, closed at the forward side by a dial plate, B. D is a gear which is actuated by means, not shown, from the prime shaft of the instrument, not shown, which is connected with a travel wheel of the vehicle. $D^1$ is an idler pinion for transmitting the rotation of the gear, D, to the gear, E, on the prime shaft of the trip counter train shown at C, which is to be reset by the resetting device. The idler pinion, $D^1$, is mounted loosely for rotation upon the same shaft which carries the intermediate pinions, $E^1$, of said counter-train, and the shaft, $E^2$, of the gear, E, is longitudinally movable through the counter wheels C for carrying the gear, E, out of mesh with the pinion, $D^1$, thereby disengaging said counter train from the driving means actuated by the vehicle travel wheel. A spring, F, lodged in an axial socket in the shaft, $F^1$, of the continuous counter-train, not shown in detail but which shaft is axially alined with the shaft, $E^2$, receives the thrust of the shaft, E, which has a reduced terminal, e, for entering said socket and encountering the spring, and the spring operates to thrust the shaft in the opposite direction for reëngagement of the gear, E, with the pinion, $E^1$.

For the purpose of resetting the trip counter-train, there is mounted upon the end of the bearing, O, of the shaft, $E^2$, which is reduced in diameter at $e^2$, as illustrated for the purpose, a housing, P, which is in the form of a T fitting, the stem, $P^1$, of the T being the part by which said fitting is mounted as stated upon said reduced end, $e^2$, of the shaft, $E^2$. In the form shown in Fig. 3 a tangent key screw, $p^1$, engaging a groove, $e^2$, (see Fig. 4) retains the housing, P, on the shaft $E^2$, with a range of adjustment about the axis of the shaft determined by the extent of the groove, $e^2$ which as illustrated is 90 degrees. The stem, $P^1$, of the housing may be split as shown in Figs. 3 and 4, the tangent key-screw, $p^1$, being inserted across the slot so that it may serve for clamping the fitting on the shaft at any position to which it may be adjusted within the range of the groove, $e^2$. In the form shown in Figs. 3 and 4, the stem, $P^1$, of the housing, P, is square, and in this form the casing, A, has the aperture, a, through which the stem of the housing is inserted when applied to the shaft, E, formed with two opposite parallel sides between which the stem, P¹, of the housing may be entered with either pair of its two opposite sides adjacent the said parallel edges of the aperture, but without capacity for rotating while thus engaged. The intention of this construction is to adapt the housing to be applied in either of two positions at right angles to each other, one of said positions being shown in Fig. 1 with the operating knob hereinafter mentioned protruding forward across the plane of the dial, the other position being shown in Fig. 2, the resetting stem being positioned parallel to the dial with the knob or handle behind the dashboard. In the cross member of the T housing there is journaled the resetting shaft, Q, which is also adapted to slide longitudinally in its bearings in said housing. On this resetting shaft there is mounted for rotation therewith a beveled gear, Q¹, which at one limit of the sliding movement of the resetting shaft, Q, meshes with a beveled gear, Q², journaled in the end of the bearing of the shaft, E², and engaged with said shaft for rotation thereby by means of a pin, e³, in said shaft engaging a slot, q², in the hub of the gear, Q². The resetting shaft, Q, has within the housing a conical cam, Q³, which is positioned for encountering the rounded end, e⁴, of the shaft, E², which protrudes beyond the gear, Q², for such encounter with the cam, the larger base of the cone-shaped cam is toward the gear, Q¹, so that when the shaft, Q, is pulled forward to draw the gear, Q¹, into mesh with the gear, Q², the cone-shaped cam, Q³, operates to thrust the shaft, E², back through its bearing against the resistance of the spring, F, in direction for carrying the gear, E, out of mesh with the pinion, D¹; with the result that when the gear, Q¹, comes into mesh with the gear, Q², the trip counter train has no driving engagement except the engagement of the gears, Q² and Q³, and is free to be operated for resetting by the rotation of the resetting shaft, Q. When the resetting shaft is thrust in the opposite direction, the spring, F, returns the shaft, E², to position for engaging the gear, E, with the pinion, D¹. For definitely positioning the gear, Q¹, at its engagement with the gear, Q², and for likewise definitely positioning it out of engagement with said gear, Q², the resetting shaft, Q, has grooves, q³ and q⁴, respectively at the larger and smaller bases of the cone cam, the grooves being shaped to seat the rounded end of the shaft, E², at the two positions indicated, the rounded end of the shaft and the corresponding shape of the grooves permitting the engagement necessary for moving the resetting shaft from one position to the other.

In the modified form of the device indicated in Fig. 6, instead of the square stem shown in Figs. 3 and 4, the stem of the housing, P, is cylindrical as shown at P² in said Fig. 6, and the case, A, may then have a circular aperture, a², as shown in said figure. Thus constructed, the housing is susceptible of adjustment to any position about the axis of the shaft, E², and not limited to the two positions at right angles to each other which are shown in Figs. 1 and 2, respectively. In this modified form the housing may be secured at the selected position of the bearing, e², by a set screw, S. Preferably, two seats, s, are provided in the periphery of the bearing, e², for engagement by the set screw, S, at the two most usually desired positions at right angles to each other. But it will be understood that the housing may be set at any other position, the screw impinging upon the bearing for securing the housing.

I claim:—

1. In a revolution meter, a manually-operable device for operating or resetting the indicating train, comprising in combination with a prime operating shaft of said train, a shaft transverse thereto; a housing in which said transverse shaft is journaled, said housing being mounted for rotation about the axis of the prime shaft, and said transverse shaft protruding from said housing for manual operation, and intermeshing gears on said shafts respectively within the housing.

2. In a revolution meter, a manually-operable device for operating or resetting the indicating train, comprising in combination with a prime operating shaft of the train, a shaft transverse thereto; a housing in which said transverse shaft is journaled, said housing being mounted for rotation about the axis of the prime shaft, said transverse shaft being protruded from said housing and exteriorly provided with means for manually rotating it, and intermeshing gears on said two shafts respectively within the housing.

3. In a revolution meter, a manually-operable operating or resetting device, comprising in combination with the prime operating shaft of the indicating train a shaft transverse thereto; a housing in which said transverse shaft is journaled and from which it protrudes for manual operation, the housing being mounted for rotation about the axis of the prime shaft; intermeshing gears on said shafts respectively within the housing, and means for definitely positioning said housing at pre-determined points in its rotation about the prime shaft.

4. In a revolution meter, in combination with a case, a counter train mounted therein; a resetting device comprising in combination with a prime operating shaft of the counter train a shaft transverse thereto; a housing in which said transverse shaft is journaled; means by which said transverse shaft is rotated in said housing, and intermeshing gears on said two shafts within said housing; said housing having a stem transverse to said transverse shaft and being mounted by means of said stem for rotation about the bearing of the prime shaft; said stem being non-circular in cross-section and the case having a non-circular opening through which said stem protrudes for journaling on said prime shaft bearing.

5. In a revolution meter, in combination with a case and a counter-train mounted therein, a resetting device comprising in combination with the prime shaft of said counter train, a shaft transverse thereto; a housing in which said transverse shaft is journaled and from which it protrudes for manual operation; intermeshing gears on said two shafts respectively within said housing, the housing having a stem transverse to the shaft which is journaled therein and being mounted by means of said stem for rotation about the bearing of the prime shaft; said stem having two flat sides and at right angles to each other, equally distant from the axis of the prime shaft, and the case having an opening through which said stem protrudes for engagement with the prime shaft bearing, said opening having one straight edge at substantially the same distance from the axis of the prime shaft as said two flat sides of the housing stem; whereby said housing is adapted to be operatively mounted in two positions ninety degrees apart about the axis of said prime shaft, and is held non-rotative in each of said positions.

6. In an odometer, in combination with a train to be operated for re-setting, comprising a longitudinally-movable shaft; a shaft transverse to said train shaft; a housing in which said transverse shaft is journaled and longitudinally slidable, the train shaft protruding into said housing; intermeshing gears on said two shafts respectively within the housing, disengageable by the sliding of said transverse shaft in said housing; a conical cam on said transverse shaft and circumferential grooves adjacent to the larger and smaller ends of said conical cam; the prime shaft having a rounded terminal adapted to engage said grooves and to be encountered and actuated by said conical cam upon the longitudinal actuation of said transverse shaft, for forcing said train shaft longitudinally in its bearing and holding the transverse shaft yieldingly at the respective limits of its longitudinal movement; the gear on the transverse shaft being positioned thereon for intermeshing with the gear on the train shaft at the limit of the movement of said transverse shaft at which the train shaft is forced in direction for resetting action.

In testimony whereof, I have hereunto set my hand at Chicago, Illinois, this 12th day of June, 1916.

FRANK A. ROSS.